March 14, 1950 — F. W. HOTTENROTH — 2,500,414
TEMPERATURE CONTROL SYSTEM
Filed Dec. 11, 1947

INVENTOR.
Frederick W. Hottenroth.
BY Bair & Freeman
Att'ys.

Patented Mar. 14, 1950

2,500,414

UNITED STATES PATENT OFFICE 2,500,414

TEMPERATURE CONTROL SYSTEM

Frederick W. Hottenroth, Goshen, Ind., assignor to Penn Electric Switch Co., Goshen, Ind., a corporation of Iowa Application December 11, 1947, Serial No. 790,984

4 Claims. (Cl. 236—68)

This invention relates to a non-electric room temperature control system adaptable for controlling the flow of heat to the room regardless of whether the heat is steam, hot water or hot air.

One object of the invention is to provide a system which is a complete unit connecting a room temperature responsive thermostat with a valve for either steam or hot water or with a damper for hot air as the case may be.

Another object is to provide a main control valve which is actuated by the heat of the heating medium and is controlled by a pilot valve which in turn is operated by a temperature responsive element, the pilot valve being connected by means of capillary tubes or the like with the main valve to form therewith a closed pressure operated control system.

Still another object is to provide a pilot valve associated with a pair of chambers and the chambers being connected with a pressure chamber of the main valve in such manner that the main valve when heated will vaporize a portion of a liquid therein thus displacing the liquid into one chamber of the pilot valve, the pilot valve being closed. When the pilot valve opens it permits the liquid to flow into the other chamber thereof and return to the pressure chamber of the main valve for re-vaporization of the liquid to produce an operating pressure which effects closure of the main valve.

A further object is to design the main valve so that a snap-acting effect is had on both opening and closing.

With these and other objects in view, my invention consists in the construction, arrangement and combination of the various parts of my control system whereby the objects contemplated are attained, as hereinafter more fully set forth, pointed out in my claims and illustrated in the accompanying drawings, wherein:

Figure 1:
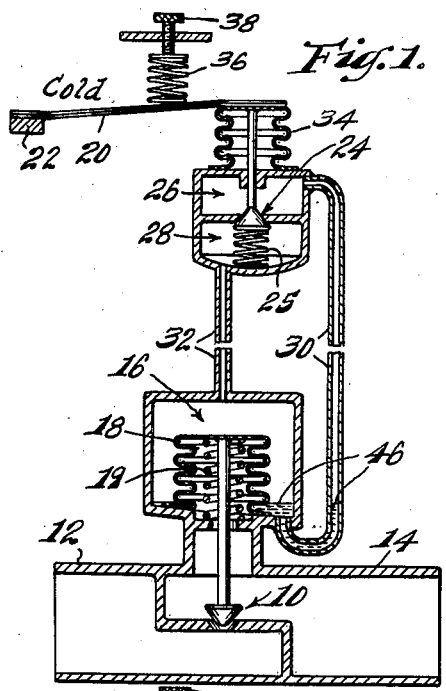
Figure 1 is a diagrammatic view of my individual room temperature control system showing the parts in dormant position with no heat flow through the main valve, the thermostat being in the cold position.

On the accompanying drawing, I have used the reference numeral 10 to indicate a spring opened main valve with a pipe 12 for steam or the like leading thereto and a pipe 14 leading therefrom as to the radiator or other room heating unit. The spring for the valve 10 is shown at 19.

In the following specification, I will refer to steam as the heating medium although the described system is operable in conjunction with a hot water valve or a hot air damper, and it is to be understood that the claims are to be construed broadly enough to encompass either a damper or a valve when reference is made thereinto the "main valve."

The heating medium or main valve 10 has associated therewith a pressure chamber 16 and a sealing bellows 18 for sealing the pressure chamber off from the outgoing side of the valve 10 yet allow steam pressure to act inside the bellows.

A room temperature responsive element in the form of a bimetal strip 20 is illustrated anchored at 22. Its opposite end is adapted to operate a spring closed pilot valve 24 which closes and opens communication between a pair of chambers 26 and 28. The spring is shown at 25. The chamber 26 is connected by a capillary tube 30 with the lower portion of the chamber 16, and a capillary tube 32 connects the chamber 28 with the upper portion of the chamber 16. A sealing bellows 34 is provided to seal off the chamber 26 from atmosphere.

A range spring 36 is provided for the bimetal element 20 and the thermostat may be adjusted by means of a screw 38 to raise or lower the range as desired.

*Practical operation*

In the operation of my individual room temperature control system, asuming the parts in the dormant position of Figure 1 with no steam flow and the thermostat cold, the valve 10 will be open and the valve 24 will be closed. Within the chamber 16 is a small quantity of liquid 46 capable of vaporization when steam is admitted to the pipe 12.

Figure 2:
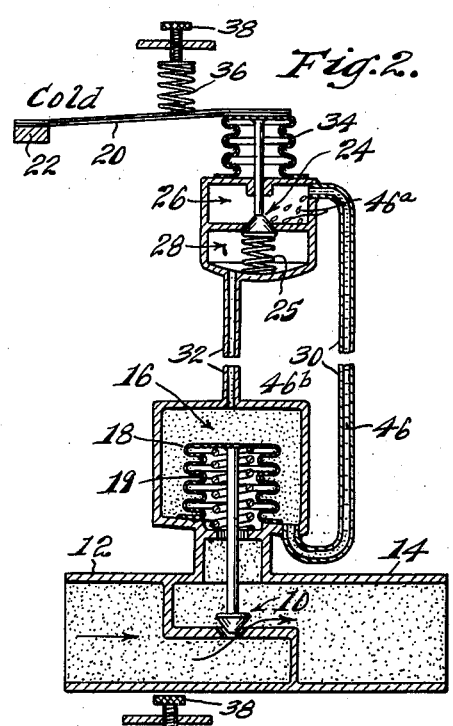
Figure 2 is a similar view showing heat flow and the main valve open.

When steam is admitted, the pipes 12 and 14 and the housing for the chamber 16 become heated thus vaporizing some of the liquid 46 (indicated by the reference numeral 46b) and displacing the rest of it through the capillary tube 30 into the upper chamber 26 of the pilot valve 24 as illustrated at 46a in Figure 2. Drops of liquid are shown issuing from the tube 30 into the chamber 26.

The action just described permits the valve 10 to remain open as the liquid is then out of the chamber 16 and most of it is in the colder chamber 26 exposed to room temperature. This of course is desirable because the thermostat is still cold and we therefore want steam flow as illustrated.

Figure 3:
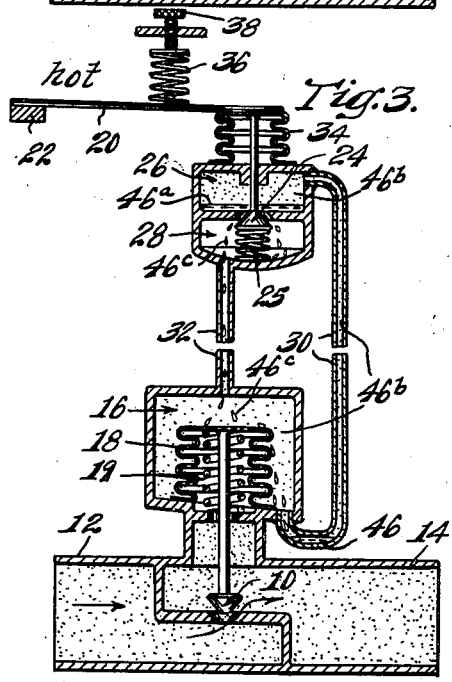
Figure 3 is a similar view showing the thermostat satisfied and commencing to close the main valve.

When the room thermostat becomes satisfied, the bimetal element 20 will warp to the hot position of Figure 3 which permits the liquid 46 in the chamber 26 to flow back through the tube 32 and into the chamber 16. Drops of liquid 46c are illustrated to show this action. The liquid is vaporized in the chamber 16 thus filling the entire closed system 16—26—28—30—32 with vapor 16b as illustrated in Figure 4 and creating a pressure therein that closes the main valve 10 against further steam flow.

Figure 4:
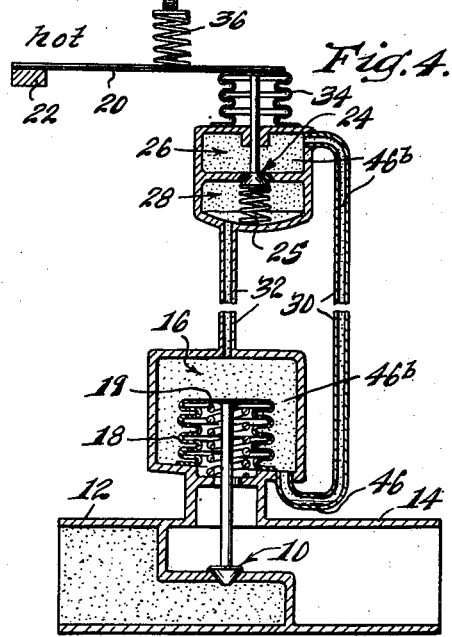
Figure 4 is a similar view showing the main valve closed.

The steam reaches the valve 19 however and keeps it hot thus keeping the liquid 46 in the vapor stage 46b in Figure 4 to maintain the valve closed until such time as the room thermostat again calls for heat and closes the pilot valve 24 as in Figure 2. The cycle of operations is then repeated beginning with condensation of the vapor 46b into liquid 46a in the chamber 26 until such time as the room thermostat is again satisfied. Such condensation of course will permit the main valve to open.

If for any reason the steam is turned off to the pipe 12 while the room thermostat is satisfied, the vapor 46b will condense back to liquid and when steam reaches the main valve 10 again it will revaporize the liquid creating a build-up of pressure to again close the valve unless the room thermostat is then calling for heat.

Assuming the parts in the position of Figure 3, vapor pressure is being built up in the closed system and is compressing the bellows 18. As soon as the main valve 10 starts to close pressure will reduce in the pipe 14 and likewise inside the bellows 18, which reduction of pressure together with increase of pressure to the vapor in the chamber 16 will accelerate the closing of the main valve 10 thus effecting substantially snap action thereof. This snap action occurs because the effective area of the seat of the valve 10 is smaller than the effective area of the bellows 18. Likewise upon opening, as soon as the valve cracks open, slight pressure builds up in the pipe 14 and inside the bellows 18 to give snap action.

From the foregoing specification, it will be obvious that I have provided a control system which is simple as far as structure is concerned and is not at all complicated from the standpoint of installation which requires no electrical wiring but merely capillary tube connections between the pilot valve and the main valve.

Some changes may be made in the construction and arrangement of the parts of my system without departing from the real spirit and purpose of my invention, and it is my intention to cover by my claims any modified forms of structure or use of mechanical equivalents which may be reasonably included within their scope.

I claim as my invention:

1. In an individual room temperature control system, a normally open main valve for a heating medium, a pressure chamber for closing said main valve upon build up of pressure therein, a pilot valve, a pair of chambers between which said pilot valve effects control of the flow of fluid, one of said chambers being above the other, a capillary tube connection between the lower portion of said pressure chamber and the upper of said chambers, a second capillary tube connection between the upper portion of said pressure chamber and the lower of said chambers, said pressure chamber, one of said capillary tubes said upper and lower chambers and the other of said capillary tubes in series constituting a closed fluid and vapor system, a small quantity of fluid in said system and a temperature responsive element for operating said pilot valve to open the same when the temperature rises and close it when the temperature falls, said pressure chamber being subject to the temperature of the heating medium flowing to said main valve.

2. In an individual room temperature control system, a main valve for a heating medium, a pressure chamber having vaporizable fluid therein for operating said main valve, a pilot valve, a pair of chambers between which said pilot valve effects control of the flow of such fluid, a hydraulic connection between the lower portion of said pressure chamber and the upper of said pair of chambers, a hydraulic connection between the upper portion of said pressure chamber and the lower of said pair of chambers, and room temperature responsive means for operating said pilot valve, said pressure chamber being subject to the temperature of the heating medium flowing to said main valve for effecting vaporization of said fluid.

3. In a temperature control system of the class described, a main valve for a heating medium, a pressure chamber, a pilot valve, upper and lower chambers between which said pilot valve effects control of the flow of fluid, tube connections between the bottom of said pressure chamber and the upper pilot valve chamber and between the top of said pressure chamber and the lower of said pilot valve chambers, temperature responsive means for operating said pilot valve to open the same when the temperature rises and close it when the temperature falls, said pressure chamber having fluid therein subject to the temperature of the heating medium flowing to said main valve, said main valve having a bellows for operating the same, said bellows being subject to the pressure in said pressure chamber and having an effective area greater than said valve to secure snap action of the main valve.

4. In an individual room temperature control system, a main valve for a heating medium, a pressure chamber therefor, a pilot valve, a housing therefor divided into a pair of chambers vertically spaced between which said pilot valve effects control of the flow of fluid, a fluid flow connection between the lower portion of said pressure chamber and the upper of said chambers of said housing, a fluid flow connection between the upper portion of said pressure chamber and the lower of said chambers of said housing, temperature responsive means for operating said pilot valve, and a bellows for operating said main valve, said bellows constituting one wall of said pressure chamber.

FREDERICK W. HOTTENROTH.

REFERENCES CITED

The following references are of record in the file of this patent:

UNITED STATES PATENTS

| Number | Name | Date |
| --- | --- | --- |
| 1,129,433 | Stratton | Feb. 23, 1915 |
| 1,285,991 | Halsey | Nov. 26, 1918 |
| 1,744,632 | Halsey | Jan. 21, 1930 |
| 1,867,384 | Scherbius | July 12, 1932 |
| 2,286,296 | McGrath | June 16, 1942 |